United States Patent
Godwin, Jr.

(10) Patent No.: US 12,296,639 B1
(45) Date of Patent: May 13, 2025

(54) AUTOMATED LIFT AXLE LOWERING SYSTEM AND METHOD FOR DUMP TRUCKS

(71) Applicant: Intellectual Property Group, LLC, Dunn, NC (US)

(72) Inventor: James Patrick Godwin, Jr., Dunn, NC (US)

(73) Assignee: Intellectual Property Group, LLC, Dunn, NC (US)

( * ) Notice: Subject to any disclaimer, the term of this patent is extended or adjusted under 35 U.S.C. 154(b) by 0 days.

(21) Appl. No.: 18/587,560

(22) Filed: Feb. 26, 2024

(51) Int. Cl.
*B60G 21/10* (2006.01)

(52) U.S. Cl.
CPC .......... *B60G 21/10* (2013.01); *B60G 2400/60* (2013.01)

(58) Field of Classification Search
CPC B62D 61/12; B62D 61/125; B60G 2300/402; B60G 2400/60; B60G 21/10; B60P 1/045
See application file for complete search history.

(56) References Cited

U.S. PATENT DOCUMENTS

| | | | | |
|---|---|---|---|---|
| 3,433,457 | A * | 3/1969 | Van Der Ende | B60S 9/12 254/423 |
| 3,464,755 | A * | 9/1969 | Brown | B60P 1/045 180/282 |
| 3,921,128 | A | 11/1975 | Snead | |
| 5,452,942 | A | 9/1995 | Brooks | |
| 11,220,304 | B1 * | 1/2022 | Bailey | B62D 61/125 |
| 11,377,805 | B2 | 7/2022 | Godwin, Jr. | |
| 11,498,469 | B2 * | 11/2022 | Wink | B60P 1/267 |
| 2002/0117823 | A1 * | 8/2002 | Mlsna | B62D 61/12 280/43.23 |
| 2005/0039968 | A1 | 2/2005 | Lashua | |
| 2005/0234622 | A1 | 10/2005 | Pillar et al. | |

(Continued)

FOREIGN PATENT DOCUMENTS

| | | |
|---|---|---|
| CA | 3072705 A1 | 8/2020 |
| JP | H10297349 A | 11/1998 |
| WO | WO-2022016238 A1 * | 1/2022 |

OTHER PUBLICATIONS

Jones, K., "Allied's Forward Controls put plow functions at driver's fingertips", APWA Snow Conference, May 28, 2019, pp. 1., Salt Lake City, Utah, https://www.trailer-bodybuilders.com/truck-bodies/article/21744020/allieds-forward-controls-put-plow-functions-at-drivers-fingertips.

*Primary Examiner* — Paul N Dickson
*Assistant Examiner* — Matthew D Lee
(74) *Attorney, Agent, or Firm* — COATS & BENNETT, PLLC

(57) ABSTRACT

A control system controls lift axles of an articulated dump truck to lower a designated lift axle when it senses the designated lift axle is in a raised position and the dump truck bed is at least partially raised. The designated lift axle is the lift axle closest to where a hydraulic piston that raises the bed connects to the dump truck frame. In one aspect, the control system additionally senses the weight of the dump truck bed (or a proxy, such as hydraulic pressure in the piston raising the bed), and only lowers the designated lift axle if the weight exceeds a predetermined threshold. Lowering the designated steer lift axle provides the full axle length (e.g., up to 8 feet) of lateral stability at the point of application of the much of the load weight to the frame. This reduces torque on the frame, and may prevent torque damage.

15 Claims, 5 Drawing Sheets

(56) References Cited

U.S. PATENT DOCUMENTS

| | | |
|---|---|---|
| 2006/0231309 A1 | 10/2006 | Lashua |
| 2008/0024463 A1 | 1/2008 | Pryor |
| 2009/0105911 A1 | 4/2009 | Okeson et al. |
| 2009/0205885 A1* | 8/2009 | Strong ................... B62D 61/12 180/24.02 |
| 2010/0133771 A1* | 6/2010 | Hudson ............... B60G 17/017 701/37 |
| 2010/0188343 A1 | 7/2010 | Bach |
| 2010/0213754 A1* | 8/2010 | Dirr .......................... B60P 1/28 298/17 B |
| 2015/0070319 A1 | 3/2015 | Pryor |
| 2016/0075324 A1 | 3/2016 | Brombach et al. |
| 2016/0264032 A1 | 9/2016 | Terada et al. |
| 2017/0016757 A1* | 1/2017 | Strong ................... G01G 19/08 |
| 2017/0023127 A1 | 1/2017 | Greasamar et al. |
| 2017/0062148 A1 | 3/2017 | Legel |
| 2017/0267043 A1* | 9/2017 | Strong ...................... B60P 1/04 |
| 2017/0344004 A1 | 11/2017 | Foster et al. |
| 2018/0198846 A1 | 7/2018 | Srinivasan et al. |
| 2018/0202539 A1 | 7/2018 | Shibata et al. |
| 2018/0244155 A1 | 8/2018 | Keenan et al. |
| 2019/0118605 A1* | 4/2019 | Strong ................. B60G 17/005 |
| 2020/0039432 A1 | 2/2020 | Lemieux |
| 2021/0156098 A1 | 5/2021 | Godwin, Jr. |
| 2023/0398921 A1 | 12/2023 | Godwin, Jr. |
| 2024/0034116 A1* | 2/2024 | Coombs ............. B60G 17/0165 |
| 2024/0301726 A1 | 9/2024 | Godwin, Jr. |

* cited by examiner

AUTOMATED LIFT AXLE LOWERING SYSTEM AND METHOD FOR DUMP TRUCKS

FIELD OF INVENTION

The present invention relates generally to articulated dump trucks, and in particular to a system and method of automatically lowering a raised lift axle of a dump truck when raising the bed to dump a load.

BACKGROUND

The global market for dump trucks in 2022 was $8.1 B, and is projected to increase to $15B by 2030. Dump trucks are used in mining, construction, waste management, snow and ice removal, and other industries. Growth in the dump truck market is driven by increased exploration in the mining industry, and renewed (post-COVID) investment in transportation infrastructure and industrial, commercial, and residential building construction. Investment in new dump trucks is required to meet stringent emissions and other environmental controls, and to take advantage of technological advances.

As well known, the bed of a dump truck is pivotally connected at its towards its rear to the truck frame, and a tail gate is hinged at the top. A hydraulic piston under the front of the bed is actuated to raise the bed at an angle, allowing the load (sand, gravel, salt, etc.) to slide out of the bed and under the tail gate, due to gravity. The hydraulic piston connects to the frame of the dump truck near the front of the lowered bed.

As the bed of a dump truck is raised, the center of mass of the truck+load rises accordingly. This makes a dump truck more "top-heavy" when the bed is raised than when it is lowered, particularly when the bed is fully loaded, e.g., with gravel, sand, salt, or the like. Conceptually, as depicted in FIG. 1A, viewing a dump truck from the front or back, the wheelbase and center of mass form a triangle, with the center of mass at the apex and, when the truck is on a level surface, nominally centered between both the truck frame and the wheels. The gross weight of the truck+load is modeled as a weight vector, always directed vertically downward. For a vehicle that is slightly tilted to one side, as depicted in FIG. 1B, the weight vector no longer acts on the center of the frame, but is closer to the down-slope side. However, it is still over the frame. As the center of mass rises—as when the bed of a dump truck is raised—the weight vector acts further to the down-slope side, as shown in FIG. 1C. A vehicle will roll, or tip over, when its center of mass moves outside its wheelbase. A truck's frame may be subject to torque damage when the weight vector is no longer over the frame at the point of application of the force, which is the case depicted in FIG. 1C (the wheels are depicted in dashed lines here, as they may not be applicable, as explained further herein).

Due to laws and regulations, many dump trucks in the US have "lift axles," which are raised and lowered to selectively place sets of wheels in contact with the ground only when the truck is loaded. The hydraulic piston that raises a dump truck bed is attached to the truck frame at the front of the bed, which roughly coincides with the position of the front lift axle. The "wheelbase" the piston experiences thus varies from up to 8 feet if the lift axle is lowered and the wheels are on the ground, to the width of the frame, which is only 34 inches, if the lift axle is raised and the wheels do not contact the ground. The risk of a tip-over, or tortional damage to the frame, is thus increased when the bed is raised to dump a load, if the front lift axle is raised at the time.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to aspects of the present disclosure, a control system controls lift axles of an articulated dump truck to lower a designated lift axle when it senses the designated lift axle is in a raised position and the dump truck bed is at least partially raised. The designated lift axle is the lift axle closest to where a hydraulic piston that raises the bed connects to the dump truck frame. In one aspect, the control system additionally senses the weight of the dump truck bed (or a proxy, such as hydraulic pressure in the piston raising the bed), and only lowers the designated lift axle if the weight exceeds a predetermined threshold. Lowering the designated steer lift axle provides the full axle length (e.g., up to 8 feet) of lateral stability at the point of application of the much of the load weight to the frame. This reduces torque on the frame, and may prevent torque damage.

One aspect relates to a method of increasing the stability of an articulated dump truck. A position of a designated lift axle is sensed. A position of the dump truck bed is sensed. In response to the dump truck bed being at least partially raised and the designated lift axle being raised, the designated lift axle is automatically lowered.

Another aspect relates to a controller configured to increase the stability of an articulated dump truck. The controller includes memory and processing circuitry operatively connected to the memory. The processing circuitry is configured to sense a position of a designated lift axle; sense a position of the dump truck bed; and in response to the dump truck bed being at least partially raised and the designated lift axle being raised, automatically lower the designated lift axle.

Yet another aspect relates to an articulated dump truck. The dump truck includes a frame and a bed rotatably connected to the frame proximate a rear end of the bed. The dump truck further includes a hydraulic actuator connected between the frame and the bed proximate a front end of the bed, whereby actuation of the hydraulic actuator pivotably raises the front portion of the bed so as to dump a load from the bed out the read end of the bed. The dump truck additionally includes one or more lift axles configured to be selectively raised such that attached tires do not contact the ground and lowered such that the tires partially support the weight of the dump truck and any load. A controller in the dump truck is configured to sense a position of a designated lift axle; sense a position of the dump truck bed; and in response to the dump truck bed being at least partially raised and the designated lift axle being raised, automatically lower the designated lift axle.

BRIEF DESCRIPTION OF THE DRAWINGS

The present disclosure will now be described more fully hereinafter with reference to the accompanying drawings, in which aspects of the disclosure are shown. However, this disclosure should not be construed as limited to the aspects set forth herein. Rather, these aspects are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary aspect thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

Dump truck development has diverged between the European and US markets. Due to the prevalence of narrow road with tight curves, European dump trucks tend to be relatively short in overall length. Also, in addition to the front wheels, the front-most wheels under the load are "actively steerable," in that they steer in response to steering wheel inputs. Despite their smaller size, due to more solid road and bridge construction, European dump trucks are often rated to carry heavier loads.

In contrast, US dump trucks tend to be longer, in large part due to US "bridge law." For the federal interstate highway system, 23 U.S.C. § 127 and 23 C.F.R. § 658 define the maximum weight for any truck according to a formula (many states have adopted the same or a similar formula governing the operation of trucks on state roads and bridges):

$$W = 500\left(\frac{LN}{N-1}\right) + 12N + 36,$$

where
  W is the overall gross weight on any group of two or more consecutive axles;
  L is the distance between the extreme of any group of two or more consecutive axles; and
  N is the number of axes.

Hence, a longer truck with more axles can carry more load. Because the operating costs of a dump truck are largely invariable (e.g., they all get around 6 mpg; operator pay does not vary significantly by truck size; etc.), increasing its length and number of axles (and hence allowed load) maximizes the truck's revenue per run. This has resulted in longer dump trucks, many of which are nearly as large, and have nearly the load capacity, as an "18-wheeler" tractor-trailer. It has also spurred the development of lift axles.

Figure 2:
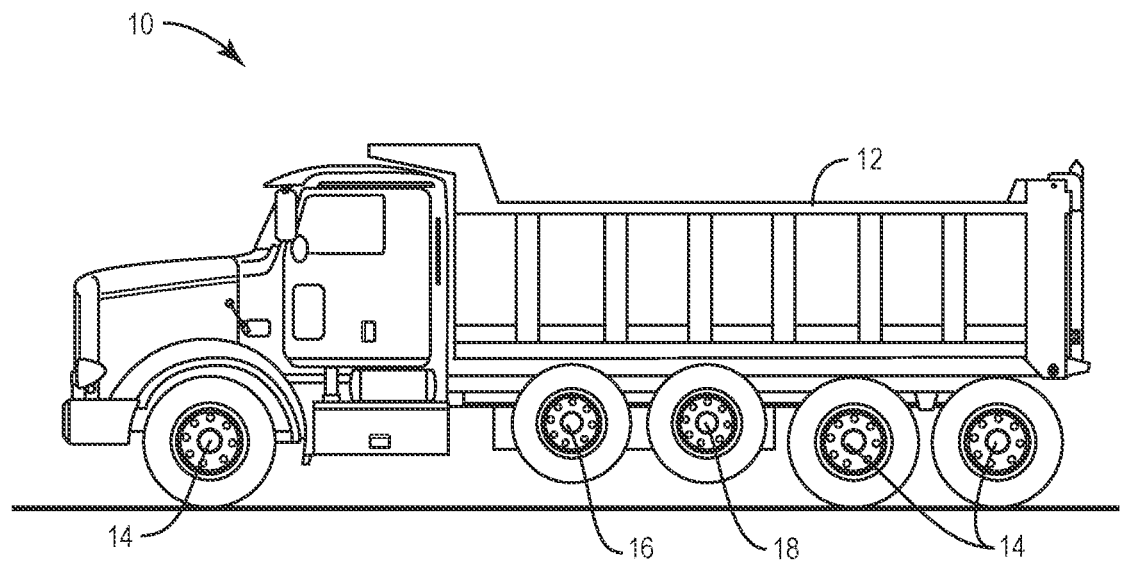
FIG. 2 shows a dump truck with two lift axles raised.

FIG. 2 depicts a representative long dump truck 10. The dump truck 10 has an articulable bed 12, which is hinged at the rear. The dump truck 10 is supported by conventional wheels on fixed axles 14. To comply with bridge laws, the length of this truck requires additional axles, but only when loaded. Hence, it has two lift axles 16, 18. Other dump trucks may have only one, or more than two, lift axles 16, 18.

Figure 3:
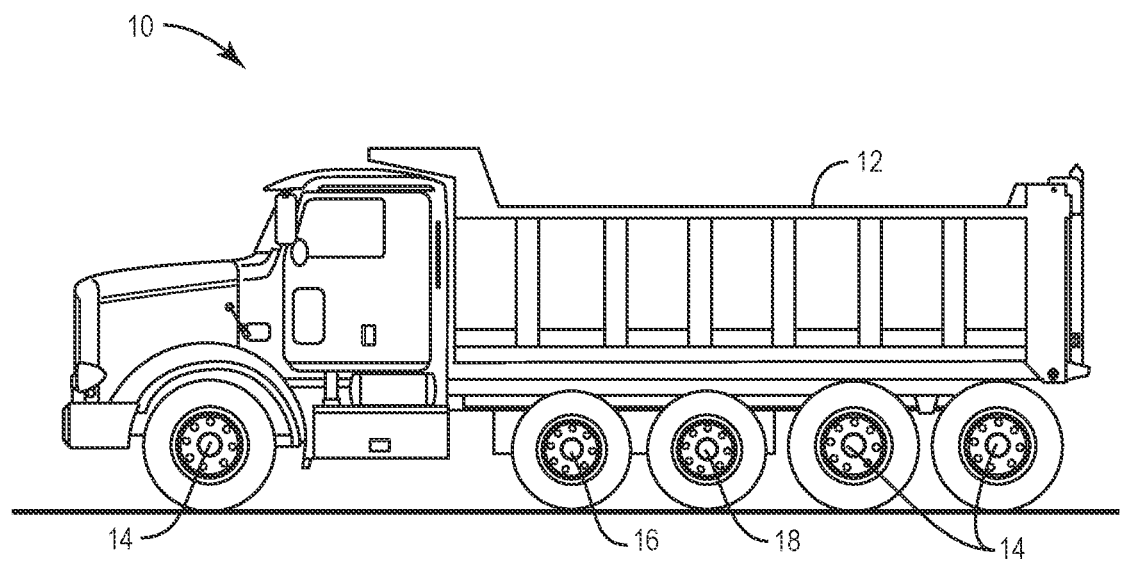
FIG. 3 shows a dump truck with two lift axles lowered.

A lift axle 16, 18 is an axle that is actuated between raised and lowered positions. When the dump truck 10 is loaded, the lift axles 16, 18 are lowered and wheels on those axles 16, 18 are on the ground and share in supporting the vehicle gross weight, as depicted in FIG. 3. However, when the dump truck 10 is empty, the lift axles 16, 18 are raised such that the wheels do not contact the ground, as depicted in FIG. 2. Lift axles 16, 18 allow long dump trucks 10 to comply with the bridge law when loaded, but preserve tire life when the dump truck 10 is empty and the extra axles 16, 18 are not needed for compliance. To aid in maneuverability of a long dump truck 10, at least the front one, and possibly two or more, lift axles 16, 18 are "passively steerable," in that the wheels turn to follow the truck's steered front wheels. These are referred to herein as steer lift axles (in the example of FIGS. 2-5, both lift axles 16, 18 are steer lift axles). The turning is referred to as passive, as the turning angles of wheels on the steer lift axles 16, 18 are not controlled by the steering wheel; they simply turn in the direction the front wheels pull the dump truck 10. Due to the mechanisms employed for this passive steering, steer lift axles 16, 18 only turn in a forward direction. Accordingly, a controller detects when the dump truck 10 is in reverse gear, and raises the steer lift axles 16, 18.

Figure 1A:
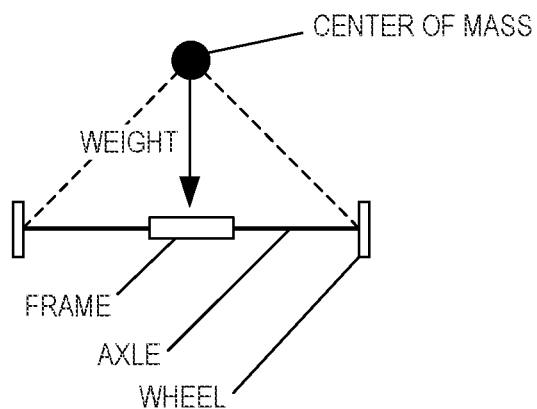
FIGS. 1A-C are diagrams of a center of mass positioned over a wheelbase, with a weight vector.
Figure 1B:
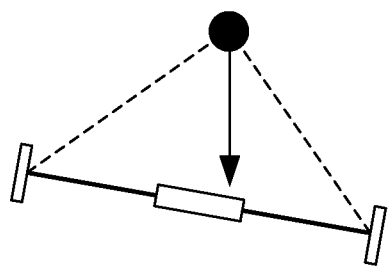
Figure 1C:
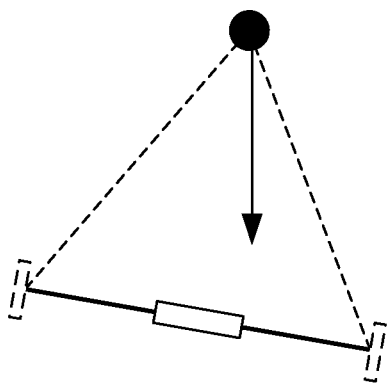
Figure 4:
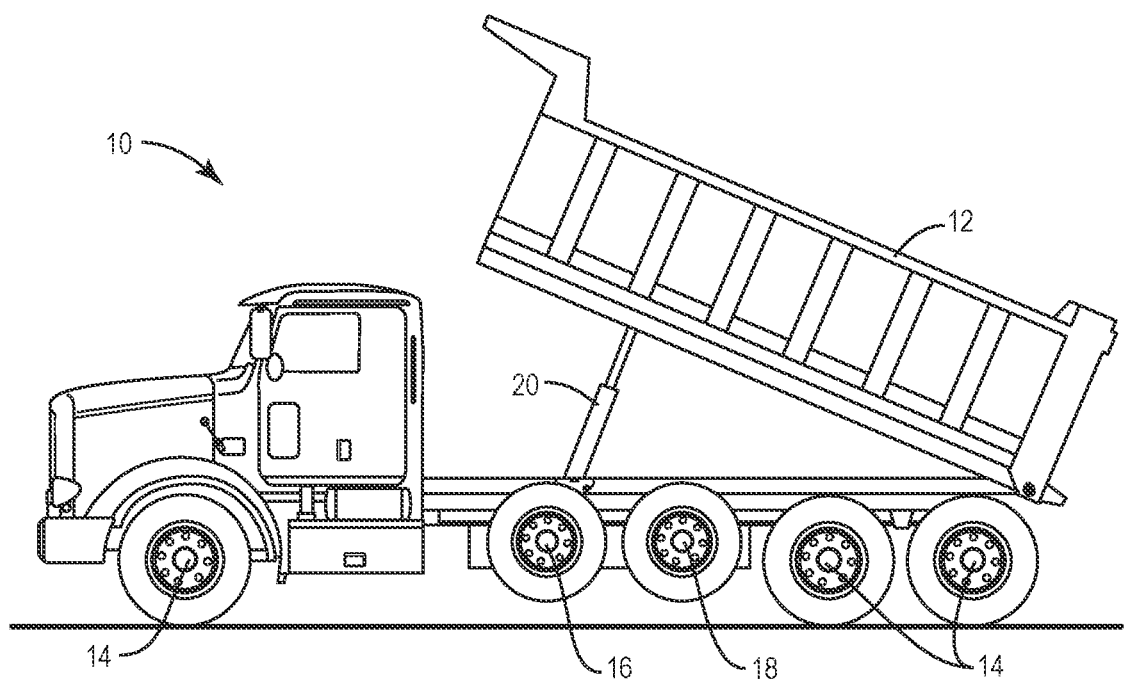
FIG. 4 shows a dump truck with two lift axles and the bed raised.

Most dump trucks 10 travel only short distances in reverse, and raising the steer lift axles 16, 18 is not an issue. However, most dump trucks 10 also back up to position the truck 10 to dump a load. As shown in FIG. 4, the steer lift axles 16, 18 are thus automatically raised just prior to actuating the hydraulic piston 20 to dump a load, and if not actively lowered, they will remain in the raised position as the dump truck bed 12 is raised. The piston 20 is connected to the truck frame at the front center of the bed 12, which roughly coincides with the location of the front lift axle 16. As suggested by the diagrams of FIG. 1A-C, while the tires on a dump truck axle may be up to 8 feet apart, the frame is only 34 inches wide. Additionally, a dump truck frame is necessarily designed to exhibit compliance, or slight deformation, to accommodate real-world non-alignment situations, such as the front wheels of the dump truck mounting a curb or going up a hill when turning into a job site, while the rear wheels remain on flat, level pavement. This designed compliance means the frame is not rigid, and may be deformed by forces and torques. With the steer lift axles 16, 18 raised when the bed 12 is raised, much of the weight of the bed+load, acting through the piston 20, is supported by the truck 10 with less than 3 feet of lateral stability (i.e., only the frame), as opposed to up to 8 feet if the front lift axle 16 were lowered such that its tires contacted the ground. Further, as shown in FIG. 1C, if the truck is parked on a slope, the weight vector of the bed+load may apply significant torque to the truck frame, causing metal fatigue as the frame bends in compliance.

Figure 5:
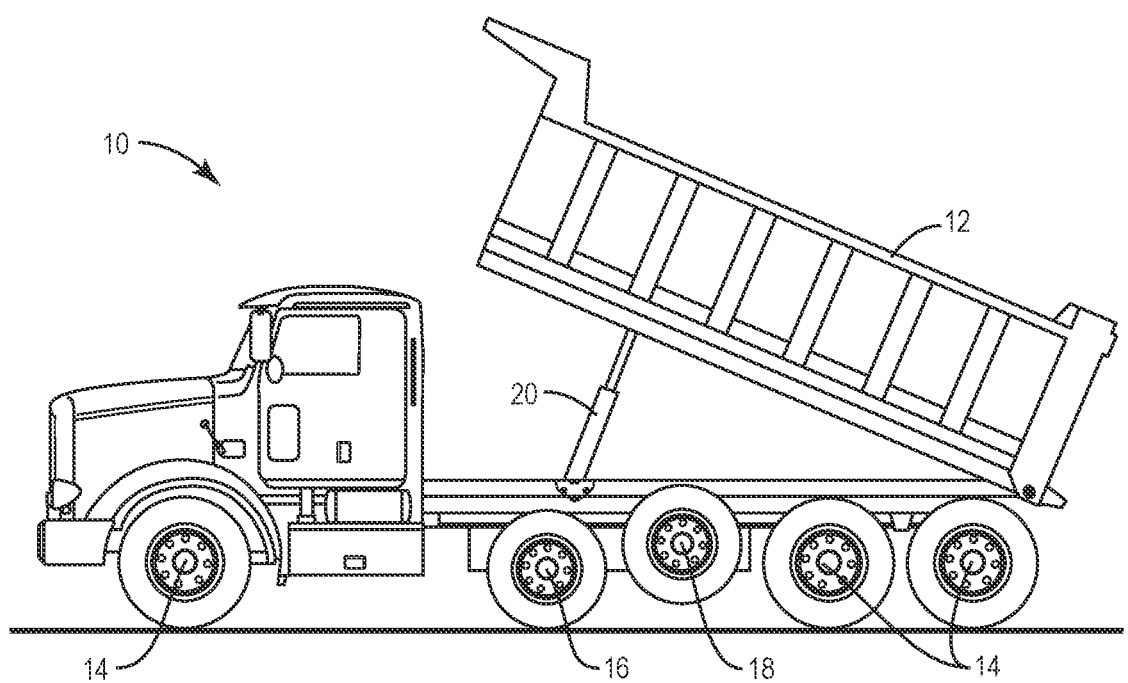
FIG. 5 shows a dump truck with one lift axle lowered and the bed raised.

According to aspects of the present disclosure, when a controller in the dump truck 10 detects that the bed 12 is at least partially raised, if a designated lift axle 16 is in a raised position, that designated lift axle 16 is lowered to its fully lowered position, placing its tires in contact with the ground. FIG. 5 illustrates this configuration. The designated lift axle 16 is predetermined—it is the lift axle 16, 18 closest to the point of attachment of the hydraulic piston 20 to the frame of the dump truck 10. This is usually the front-most lift axle 16, as depicted in FIG. 5, but on some dump trucks it may be a different lift axle 18. Lowering the designated lift axle 16 provides the full wheelbase—up to 8 feet—of lateral stability directly under the hydraulic piston 20, which is where much of the bed+load weight is centered as the bed 12 is being raised. This increased lateral stability better supports the weight, particularly if the dump truck 10 is parked on a slope. The increased lateral stability helps prevent both tip-over of the dump truck 10, and damage or fatigue to the truck frame caused by torque induced by a non-centered application of the load weight.

The most common reason the designated lift axle 16 may be raised upon raising the bed 12 to dump a load, is that it is a steer lift axle 16, which is automatically raised when the dump truck 10 backs up in reverse gear to position the truck 10 for dumping. However, the benefits of increased lateral stability at the point of application of the load weight to the truck frame accrue regardless of whether the designated lift axle 16 is a steer lift axle 16 or a fixed lift axle 16. For example, even on a dump truck 10 without steer lift axles, an operator may raise all lift axles 16, 18 upon arrival at a job site where the load is to be dumped, as the bridge law requiring the extra axles 16, 18 only applies on public roads, and the operator may wish to obviate the risk of debris on the job site puncturing a tire on a lift axle 16, 18. Accordingly, steerability of the designated lift axle 16 is not a limitation of aspects of the present disclosure. Rather, the designated lift axle 16 is always lowered, regardless of whether or not it is a steer lift axle 16, if it is in a raised position when the dump truck bed 12 is raised.

Figure 6:
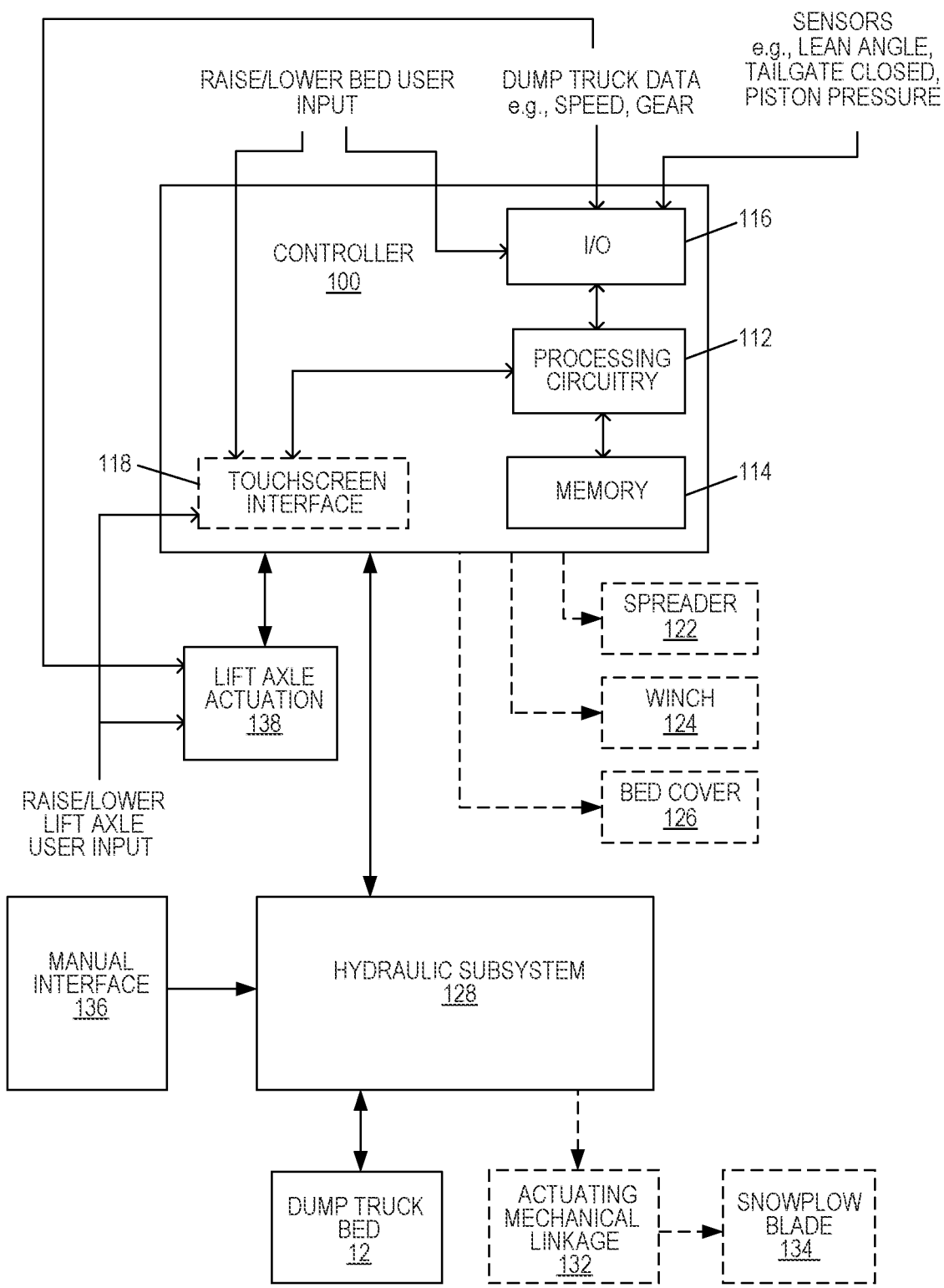
FIG. 6 is a block diagram of a controller configured to increase the stability of a dump truck.

FIG. 6 depicts a block diagram of a control system for a dump truck, according to aspects of the present disclosure. The system includes a computerized controller 100, which may for example be implemented with a tablet computer, integrated into the dump truck dashboard, part of the truck chassis computer system, or the like. The controller 100 includes processing circuitry 112, non-transitory memory 114, Input/Output (I/O) functionality 116, and optionally (as indicated by dashed lines) a touchscreen user interface 118.

The processing circuitry 112 may comprise one or more hardwired state machines, programmable logic with associated firmware, one or more general purpose microprocessors or Digital Signal Processors with associated software, or any combination of these. The non-transitory memory 114 may comprise register files in the processing circuitry 112, solid state memory (e.g., DRAM, SRAM, SSD, Flash, etc.), optical media (e.g., CD, DVD), magnetic media, or any other type of non-transitory digital media known in the art. Although depicted as internal to the controller 100, the non-transitory memory 114 may include external data storage, such as an SD card, external disc drive, or the like.

The I/O functionality 116 is configured to receive certain data and parameters from the dump truck, such as the truck's speed, what gear it is in, and the like. As non-limiting examples, the I/O 116 may connect to an OnBoard Diagnostics (OBD) port of the dump truck, may comprise a node on a Controller Area Network (CAN) bus, or the like. In some aspects, the I/O functionality 116 may not connect to a port or bus of the dump truck 10. The I/O functionality 116 is further configured to receive data from one or more sensors installed in or added to the dump truck 10, such as a lean angle sensor, a tailgate closed sensor, a hydraulic pressure sensor, and the like.

The I/O functionality 116 may additionally receive user input to raise or lower the dump truck bed 12, such as by a user pressing a rocker switch. In one aspect, this (and other) switches may be located on the dump truck steering wheel, and may swap functionality between dump truck bed 12 raise/lower input and conventional input (such as audio system control, cruise control, or the like). The user may additionally, or alternatively, input dump truck bed 12 raise/lower commands via the touchscreen interface 118 of the controller 100.

In some aspects, the controller 100 may optionally (as indicated by dashed lines) control accessories and aftermarket equipment installed on the dump truck. Examples include a sand/salt spreader 122 on a dump truck 10 configured as a snowplow; a winch 124; an automated bed cover 126; or other equipment.

The controller 100 controls a hydraulic subsystem 128. The hydraulic subsystem 128 controls raising and lowering of the dump truck bed 12. As indicated by double-headed arrows on the lines between the controller 100 and the dump truck bed 12 (via hydraulics subsystem 128), commands flow from the controller 100 to cause the dump truck bed 12 to raise and lower, and sensor data flows from the dump truck bed 12 (and hydraulics subsystem 128) to the controller 100, reporting at least the position of the dump truck bed 12, and in some cases additional data, such as hydraulic pressure. In some aspects (as indicated by dashed lines), the hydraulic subsystem 128 may additionally control hydraulic accessories and hydraulic aftermarket equipment installed on the dump truck, such as an actuating mechanical linkage 132 that controls the height, angle, and the like of a snowplow blade 134. The hydraulic subsystem 128 may additionally have a legacy manual interface 136.

The controller 100 additionally connects to a lift axle actuation mechanism 138. Lift axles 16, 18 are typically electrically actuated, and the actuation mechanism 138 includes controls, such as accepting user input to raise and lower the lift axles 16, 18. On dump trucks 10 with steer lift axles 16, 18, the lift axle actuation mechanism 138 additionally senses when the dump truck 10 is in reverse gear, so it can raise the steer lift axles 16, 18. It may obtain a gear indication from the OBD port or a CAN bus node, as described above, or may it simply read a sensor installed on a gear shifter. In some aspects, the controller 100 additionally reads the status, or position, of all lift axles 16, 18 from the lift axle actuation mechanism 138, and displays this information on a display, such as the touchscreen interface 118. In some aspects, the user may raise and lower lift axles 16, 18 by interaction with the touchscreen interface 118 as well as, or in lieu of, the legacy lift axle actuation mechanism 138 inputs. Aspects of the present disclosure are suitable for installation in existing dump trucks 10, and the controller 100 is designed and programmed to interact with legacy equipment such as an existing lift axle actuation mechanism 138. In other aspects, it is contemplated that the functionality of the controller 100 will be incorporated into the dump truck 10 design and original manufacture; in these aspects, the controller 100 may control all aspects of lift axle 16, 18 actuation, essentially absorbing the functionality of the lift axle actuation mechanism 138 (enhanced by the inventive functionality of the present disclosure).

According to aspects of the present disclosure, the controller 100 is configured to sense or otherwise ascertain the position of a designated lift axle 16. The designated lift axle 16 is determined and programmed into non-volatile memory 114 when the controller 100 is installed in a particular dump truck 10 (or the inventive functionality programmed into an existing controller 100). The controller 100 is further configured to sense or otherwise ascertain when the bed 12 is in at least a partially raised position, such as when an operator begins to raise the bed 12 to dump a load. In response to the bed 12 being at least partially raised and the designated lift axle 16 being raised (such as from the dump truck 10 having been operated in reverse gear), the controller 100 is configured to control the lift axle actuation mechanism 138 to lower the designated lift axle 16. In one aspect, the controller 100 controls the dump truck bed 12, via hydraulic subsystem 128, to halt further raising until the designated lift axle 16 has been fully lowered. In other aspects, the controller 100 begins lowering the designated lift axle 16 as soon as it detects that the dump truck bed 12 is at least partially raised, and the designated lift axle 16 lowers as the dump truck bed 12 rises.

The maximum lateral stability at the point of attachment of the hydraulic piston 20 to the dump truck frame may only be required when the dump truck 10 is fully loaded, or the bed 12 is lifting weight in excess of a predetermined threshold. In one aspect, upon sensing or otherwise ascertaining that the dump truck bed 12 is at least partially raised, the controller 100 senses or otherwise ascertains the weight of the bed+load. This may comprise reading one or more weight sensors, or the controller may use a proxy for bed+load weight, such as hydraulic pressure in the bed-lifting piston 20. A predetermined threshold bed+load weight (or hydraulic pressure, or other weight-related parameter value) is programmed into non-volatile memory 114 when the controller 100 is installed in a particular dump truck 10, or when an existing controller 100 is programmed to include the inventive functionality. In this aspect of the present disclosure, if the ascertained weight of the bed+load is less than the predetermined threshold, and the lift axles 16, 18 are raised when the bed 12 is raised, the controller 100 does not lower the designated lift axle 16.

Figure 7:
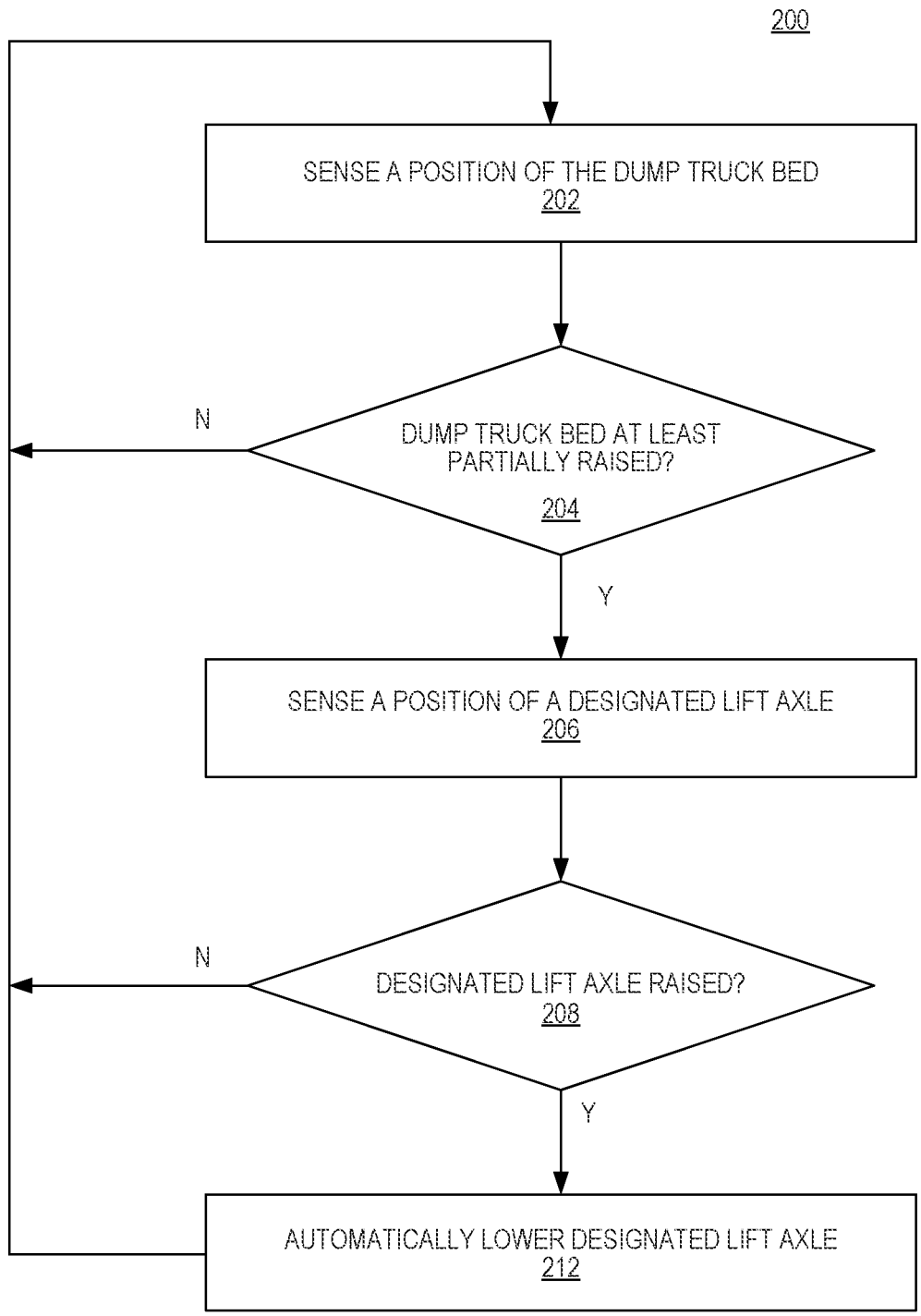
FIG. 7 is a flow diagram of a method of increasing the stability of a dump truck.

FIG. 7 depicts the steps in a method 200 of increasing the stability of an articulated dump truck 10. The position of the dump truck bed 12 is sensed (block 202), such as via the hydraulic subsystem 128, or through a sensor. If the dump truck bed 12 is fully lowered (block 204), the method continues to monitor the dump truck bed 12 position (block 202). When it is sensed that the dump truck bed 12 is at least partially raised (block 204), the position of a designated lift axle 16 is sensed (block 206). If the designated lift axle 16 is lowered (block 208), no action is taken and the method 200 continues to monitor the dump truck bed 12 position (block 202) and designated lift axle 16 position (block 206). However, in response to the dump truck bed 12 being at least partially raised (block 204) and the designated lift axle 16 being raised (block 208), the designated lift axle 16 is automatically lowered (block 212), to increase the lateral stability of at least the dump truck frame.

Those of skill in the art will readily recognize that the specific order of steps in method 200 depicted in FIG. 7 is exemplary only, and is not limiting. In general, the controller 100 may sense the position of the dump truck bed (block 202) and the position of the designated lift axle 16 (block 206) continuously, or periodically in rapid succession. The controller 10 may make comparisons and determinations (blocks 204, 208) contemporaneously with the sensing steps. Accordingly, any causality implied by the order of method steps in FIG. 7 (e.g., designated lift axle 16 position is only sensed if the dump truck bed 12 is at least partially raised) is not a limitation of aspects of the present disclosure. In other words, the controller 100 will automatically lower the designated lift axle 16 if it is raised and the dump truck bed 12 is at least partially raised—regardless of the order in which the sensing and comparison steps are performed.

In aspects of the present disclosure described above, only the designated lift axle 16 is automatically lowered if it is raised when the dump truck bed 12 is at least partially raised. In other aspects, two or more, or all, of the lift axles 16, 18 on a dump truck may be automatically lowered if they are raised when the dump truck bed 12 is at least partially raised. This maximizes the lateral stability of the dump truck 10, and may be a preferred aspect, particularly for dump trucks 10 that routinely dump their loads on sites where the ground is not level.

Aspects of the present disclosure present numerous advantages over the prior art. By lowering at least a designated lift axle 16 when the dump truck bed 12 is at least partially raised, the lateral stability of the dump truck 10 is increased, reducing the chance of a tip-over or tortional damage to the truck frame. Aspects of the present disclosure provide a solution to the inherent shortcoming of dump trucks 10 with steer lift axles 16, 18 having those steer lift axles 16, 18 automatically raised upon driving the dump truck 10 in reverse gear, which often is the last maneuver prior to raising the dump truck bed 12 to dump a load.

The present disclosure may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A method of increasing the stability of an articulated dump truck, comprising:
   sensing a position of a designated lift axle;
   sensing a position of the dump truck bed; and
   in response to the dump truck bed being at least partially raised and the designated lift axle being raised, automatically lowering the designated lift axle.

2. The method of claim 1 further comprising ascertaining a weight of the dump truck bed and any load it contains, and wherein automatically lowering the designated lift axle comprises automatically lowering the designated lift axle only if the weight of the dump truck bed and load exceeds a predetermined threshold.

3. The method of claim 2 wherein ascertaining the weight of the dump truck bed and any load it contains comprises ascertaining a hydraulic pressure in a hydraulic piston actuating the dump truck bed, and wherein the predetermined threshold is a threshold hydraulic pressure value.

4. The method of claim 1 wherein the designated lift axle is passively steerable, and wherein the designated lift axle is automatically raised when the dump truck is driven in reverse gear.

5. The method of claim 1 wherein automatically lowering the designated lift axle further comprises automatically lowering all raised lift axles on the dump truck.

6. A controller configured to increase the stability of an articulated dump truck, comprising:
   memory; and processing circuitry operatively connected to the memory, and configured to
  sense a position of a designated lift axle;
  sense a position of the dump truck bed; and
  in response to the dump truck bed being at least partially raised and the designated lift axle being raised, automatically lower the designated lift axle.

7. The controller of claim 6 wherein the processing circuitry is further configured to ascertain a weight of the dump truck bed and any load it contains, and wherein the processing circuitry is configured to automatically lower the designated lift axle by automatically lowering the designated lift axle only if the weight of the dump truck bed and load exceeds a predetermined threshold.

8. The method of claim 7 wherein the processing circuitry is configured to ascertain the weight of the dump truck bed and any load it contains by ascertaining a hydraulic pressure in a hydraulic piston actuating the dump truck bed, and wherein the predetermined threshold is a threshold hydraulic pressure value.

9. The method of claim 6 wherein the designated lift axle is passively steerable, and wherein the designated lift axle is automatically raised when the dump truck is driven in reverse gear.

10. The method of claim 6 wherein the processing circuitry is configured to automatically lower the designated lift axle further by automatically lowering all raised lift axles on the dump truck.

11. An articulated dump truck, comprising:
  a frame;
  a bed pivotably connected to the frame proximate a rear end of the bed;
  a hydraulic actuator connected between the frame and the bed proximate a front end of the bed, whereby actuation of the hydraulic actuator pivotably raises the front portion of the bed so as to dump a load from the bed out the read end of the bed;
  one or more lift axles configured to be selectively raised such that attached tires do not contact the ground and lowered such that the tires partially support the weight of the dump truck and any load; and
  a controller configured to
    sense a position of a designated lift axle;
    sense a position of the dump truck bed; and
    in response to the dump truck bed being at least partially raised and the designated lift axle being raised, automatically lower the designated lift axle.

12. The dump truck of claim 11 wherein the controller is further configured to ascertain a weight of the dump truck bed and any load it contains, and wherein the controller is configured to automatically lower the designated lift axle by automatically lowering the designated lift axle only if the weight of the dump truck bed and load exceeds a predetermined threshold.

13. The method of claim 12 wherein the controller is configured to ascertain the weight of the dump truck bed and any load it contains by ascertaining a hydraulic pressure in the hydraulic actuator, and wherein the predetermined threshold is a threshold hydraulic pressure value.

14. The method of claim 11 wherein the designated lift axle is passively steerable, and wherein the designated lift axle is automatically raised when the dump truck is driven in reverse gear.

15. The method of claim 11 wherein the controller is configured to automatically lower the designated lift axle further by automatically lowering all raised lift axles on the dump truck.

\* \* \* \* \*